United States Patent [19]

Wada et al.

[11] Patent Number: 4,690,846

[45] Date of Patent: Sep. 1, 1987

[54] RECORDING DISK SUBSTRATE MEMBERS AND PROCESS FOR PRODUCING SAME

[75] Inventors: Toshiaki Wada, Takatsuki; Yoshiaki Katsuyama, Muro; Junichi Nakaoka, Amagasaki, all of Japan

[73] Assignee: Sumitomo Special Metals Co., Ltd., Osaka, Japan

[21] Appl. No.: 759,366

[22] Filed: Jul. 26, 1985

[30] Foreign Application Priority Data

Aug. 15, 1984 [JP] Japan ................................ 59-169409

[51] Int. Cl.$^4$ ...................... H01F 10/02; B05D 1/38; B32B 7/02
[52] U.S. Cl. ..................................... 428/64; 428/409; 428/432; 428/698
[58] Field of Search ................ 428/409, 432, 64, 698, 428/699, 701

[56] References Cited

U.S. PATENT DOCUMENTS

| | | | |
|---|---|---|---|
| 3,198,657 | 8/1965 | Kimball et al. | 427/240 X |
| 3,959,553 | 5/1976 | Hartmann et al. | 428/418 X |
| 4,046,932 | 9/1977 | Hartmann et al. | 428/418 X |
| 4,254,189 | 3/1981 | Fisher | 428/432 X |
| 4,396,682 | 8/1983 | Mohri et al. | 428/432 X |
| 4,528,212 | 7/1985 | Cairns et al. | 428/432 X |

*Primary Examiner*—Nancy A. Swisher
*Attorney, Agent, or Firm*—Burns, Doane, Swecker & Mathis

[57] ABSTRACT

A substrate member for recording disk characterized in that a glass coating film is provided on an alumina base ceramic material having micropores of no larger than 5 microns and a relative theoretical density of no less than 96%, said glass coating film having a surface roughness of no more than 80 angstroms, being substantially pore-free and strain-free on the surface, and having a thickness of 0.3 to 200 microns and a relative difference of no more than $10^{-6}$/deg in the coefficient of thermal expansion with respect to said base material.

8 Claims, 6 Drawing Figures

(A)

(B)

(A)

(B)

(A)

(B)

RECORDING DISK SUBSTRATE MEMBERS AND PROCESS FOR PRODUCING SAME

FIELD OF THE INVENTION

The present invention relates to a substrate member for recording disks, particularly, magnetic recording disks, having a void-free and strain-free surface layer as well as an improved surface roughness, and to a process for producing same.

BACKGROUND

In general, the substrate members (or substrates) for magnetic recording disks are required to possess the following properties that:

1. They have an improved surface roughness after polishing so as to achieve stable floating of magnetic heads and stable recording properties in association with a head floating height of as low as 0.3 micron or less.
2. They are free from any projections or pinhole-like indentations which are essentially attributable to a deficiency of the magnetic thin film formed on the surface of the substrate.
3. They have mechanical strength sufficient to withstand machining, polishing or high-speed rotation during use.
4. They have corrosion, weather and heat resistance.

Hitherto, the substrates for magnetic disks have made use of aluminum alloys. However, the Al alloy materials provide insufficient substrate materials for high-density magnetic recording disks due to an unfavorable surface state of the substrate which includes protrusions, indentations and a wave-like configuration. Namely, in the Al alloy materials, the crystal anisotropy, material deficiency and non-metallic inclusions thereof remain on the surface of the substrates and give rise to protrusions or indentations upon machining and/or polishing whereupon certain hard spots fall away from the substrates to leave behind indentations, so that polishing only results in a surface roughness of at most about 200 angstroms.

The machined quality of magnetic disk substrates directly affects the run-outs and acceleration component caused by the magnetic recording disks, the signal error of magnetic recording media, and the like.

As the Al alloys are metallic materials, they have a Vickers hardness on the order of Hv 100 (that of ceramics is more than 600) and a bending strength on the order of 1000 kg/cm$^2$ (that of ceramics is more than 4000 kg/cm$^2$). For that reason, more stringent limitations are now imposed upon the dimensional accuracy stipulated in respect of scratch, flaw, smoothness and wave configuration as the recording density increases, and involve more difficulty in machining. Machining using abrasive grains also causes incidental packing of abrasive particles, which entails another problem. In the case of the Al alloy substrates, a great deal of care should also be taken with regard to cleanliness, rust prevention, contamination, etc. in the production steps inclusive of lathe turning and polishing and in the storage period in order to secure the surface corrosion and weather resistance thereof and the prevention of the surface contamination thereof.

For the purpose of improving the Al alloy substrates, it has been known to form a film with a high hardness on the surface thereof. As an example, it has been proposed to form an alumite layer on the surface of Al alloys, thereby increasing hardness, in order to improve abrasive machinability. However, traces of impurities (Fe, Mn, Si) contained in the Al alloys precipitate as intermetallic compounds during the formation of alumite, which are responsible for the occurrence of the indentation deficiency after the alumite treatment. It is extremely difficult to further improve the purity of mother alloys in view of the production process. In addition, the Al alloys cause a handling problem in view of corrosion resistance and cleanliness. Furthermore, the production of thin film magnetic recording media by plating or sputtering poses problems in connection with the occurrence of chemical reactions and diffusion between the Al alloys and the magnetic films. In some cases, it is required to apply a heat treatment to the magnetic films depending upon the type of steps applied. However, such a heat treatment will readily cause deformation and lowering of the dimensional accuracy of the Al alloy substrates, simultaneously causing increases in the surface vibration and acceleration. Thus, it is difficult to apply that treatment.

Although there is available a method for forming oxides such as SiO$_2$, Al$_2$O$_3$ and the like on the Al substrates by sputtering, this method is disadvantageous in that the adhesion of the Al substrate to the sputtered oxides is weak.

Ceramic materials have become widely used in various fields due to their superiority over Al alloy base disk substrates with respect to heat resistance, wear resistance, weather resistance, and insulation and mechanical strength. In the substrates for magnetic disks having recording media treated on the substrate surface, however, there is a strong demand for the surface thereof to be free of any holes and strain in association with the thinning and high-densification of the recording media.

Generally, the methods for producing ceramic substrates embrace single crystallization; forming with a mold, rubber press, doctor blade, etc. followed by sintering; and hot pressing (HP process) as well as hot isostatic pressing (HIP process) for obtaining a high density. However, the single crystallization is not only high in the production cost, but also encounters difficulty in the production of any substrates having an increased diameter. On the other hand, although it is possible to produce highly densified substrates by the HIP or HP processes, there arise certain reliability problems such as the occurrence of drop-outs, head crush, etc. due to minute surface deficiencies (micropores of 5 microns or less) of the resulting substrates, where they are used for magnetic recording disks.

In general, the mechanochemical polishing method, which is applicable to the disk substrates, etc. as the surface polishing method, has been known to finish the surface of Si substrates, GGG crystals, ferrite, etc. without incurring deterioration of the surface physical properties thereof. However, where the mechanochemical polishing method is applied and ceramic materials in which micropores exist, such pores are exposed to open on the surface, resulting in insufficient substrates for magnetic disks. Where the mechanochemical polishing method is applied to the alumina base ceramic materials, on the other hand, it is likely that exposure of micropores takes place simultaneously with the occurrence of a stepwise surface difference between crystals due to the difference in the rate of chemical erosion on the different surfaces of component grains or crystal grains.

SUMMARY OF THE DISCLOSURE

The present invention has for its objects to obtain novel substrate members for recording disks, particularly magnetic recording disks, which are based on ceramic materials, and reduce or eliminate the drawbacks of the prior art, and to provide a process for the production thereof.

According to the basic characteristic features of the present invention, there is provided an alumina base ceramic substrate having a substantially pore-free and strain-free layer finished to a surface roughness of not more than 80 angstroms (preferably no more than 50 angstroms, most preferably no more than 20 angstroms) with a view to improving the properties, and assuring the reliability, of a recording (e.g., magnetic recording) film formed on the surface thereof, and a process for the production thereof. The recording film typically comprises a magnetic recording film or films, however, may be an optical or photomagnetic recording film or the like recording film, generally. In the following the present invention will be described based on embodiments of the magnetic recording disks for the illustrative purpose.

More specifically, the substrate for the recording disks according to the present invention is characterized by a glass film provided on the surface of an alumina base ceramic material having therein micropores of no larger than 5 microns and a relative theoretical density of no less than 96%, the glass film having a surface roughness of no more than 80 angstroms, being substantially pore-free and strain-free on the surface, having a thickness of 0.3 to 200 microns ($\mu$m) and having a relative difference in the coefficient of thermal expansion of $10^{-6}$/deg or less within a range from 20° C. to the strain point of glass with respect to said ceramic material.

The process for producing substrate members for recording disks according to the present invention is characterized in the steps:

forming a glass film having a relative difference in the coefficient of thermal expansion of $10^{-6}$/deg or less within a range from 20° C. to the strain point of glass with respect to said ceramic material and having a thickness of 0.5 to 220 microns ($\mu$m) on the surface of alumina base ceramic material including therein minute pores of no more than 5 microns ($\mu$m) with a relative theoretical density of no less than 96%, and polishing the surface of said glass film under a load of 0.05 to 2 kg/cm$^2$ with a suspension in which 0.1 to 20% by weight of a fine powder of at least one selected from the group consisting of $SiO_2$, MgO, $Al_2O_3$, $CeO_2$ and $Fe_2O_3$, each of no larger than 0.1 micron ($\mu$m) and of 99% purity or more, is suspended in pure water, until obtaining a substantially pore-free and strain-free surface layer having a thickness of 0.3 to 200 microns and a surface roughness of no more than 80 angstroms.

The term "strain point of glass" denotes the temperature where the glass has a viscosity of $10^{14.5}$ Poise.

The term "polishing" used herein generally has a broad meaning embracing, e.g., lapping or buffing or the like finishing process such that uses loose fine abrasives or powders in the wet state.

The term "strain-free" denotes the state such that the affected surface layer due to processing, i.e., the Bailby layer thickness is no more than 50 angstroms as measured by an Ellipsometer, the Beilby layer thickness being preferably no more than 20 angstroms.

The term "pore-free" denotes the state such that on the surface there is no pores having a diameter exceeding 0.2 micron (preferably 0.1 micron).

The glasses used for the coating film according to the present invention embrace silicate base glasses such as soda lime glass (based on $Na_2O$—CaO—$SiO_2$), lead glass (based on $K_2O$—PbO—$SiO_2$), borosilicate glass (based on $Na_2O$—$B_2O_3$—$SiO_2$), alumina silicate glass (based on CaO—MgO—$Al_2O_3$—$SiO_2$) and the like. Depending upon their composition, these glasses have various softening points. Where it is required to apply a heat treatment of no lower than 200° C. to the deposited magnetic film during the preparation of thin-film recording medium, glasses having a higher softening point may suitably be used. Where a heat treatment temperature is lower, it is possible to use any one of the glasses. If there is a large difference in the coefficient of thermal expansion between the base material and the glass, then warping, breakage and other problems arise due to an increase in the relative stresses therebetween. It is thus required that there be a relative difference of no higher than $1 \times 10^{-6}$/deg in the coefficient of thermal expansion between the base material and the glass. Since it is desired that compression stress is applied to the surface of the glass coating film, it is preferred that the coefficient of thermal expansion of glass is smaller than that of the base material. Most preferably, the relative difference in the coefficient of thermal expansion is as small as possible, and the temperature-dependent variations of the coefficients of thermal expansion of the glass and the base material at 20° C. to the strain point show the same tendencies.

Among the alumina base materials, the application of the glass coating film according to the present invention to the $Al_2O_3$—TiC—$TiO_2$ and $Al_2O_3$—$Fe_2O_3$—TiC base materials may be achieved generally by the deposition technique such as sputtering, vapor deposition and ion plating processes, while the application of the glass coating film to the $Al_2O_3$ and $Al_2O_3$—$TiO_2$ base materials may be done by glazing or the deposition technique such as the sputtering, vapor deposition and ion plating processes. When relying upon the glazing process, use is made of glasses having a softening point of no higher than 800° C. This is because, when the glass used has a softening point exceeding 800° C., a heat-treatment temperature during the formation of the glass coating film becomes too high resulting in deformation of the resultant substrate member. It is preferred that, to form more effectively the coating film, the film of $SiO_2$ is previously formed with a view to improving the adhesion density and compatibility of the base material with respect to the glass.

BRIEF DESCRIPTION OF THE DRAWINGS

The foregoing and other objects and features of the present invention will become apparent from the following detailed description with reference to the the accompanying drawings, which are given for the purpose of illustration, and in which.

PREFERRED EMBODIMENTS

Figure 1:
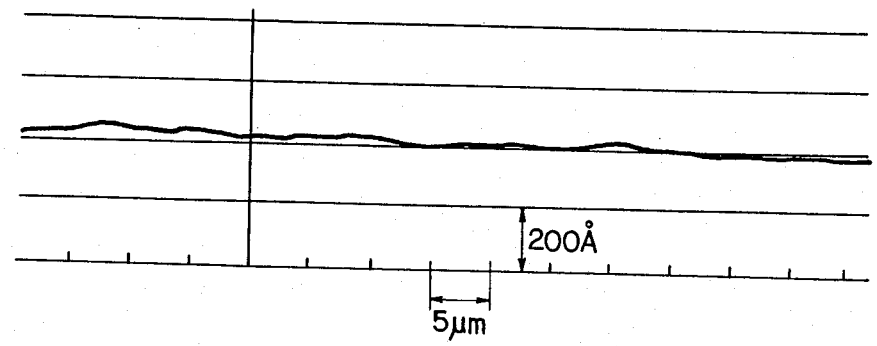
FIGS. 1A and 1B, 2A and 2B and 3A and 3B are graphs showing the results of measurement of the surface state of Examples 1, 2 and 3 of the present invention, A indicating the surface of the glass coating films after polishing, and B showing the surface of alumina base materials.
Figure 1:
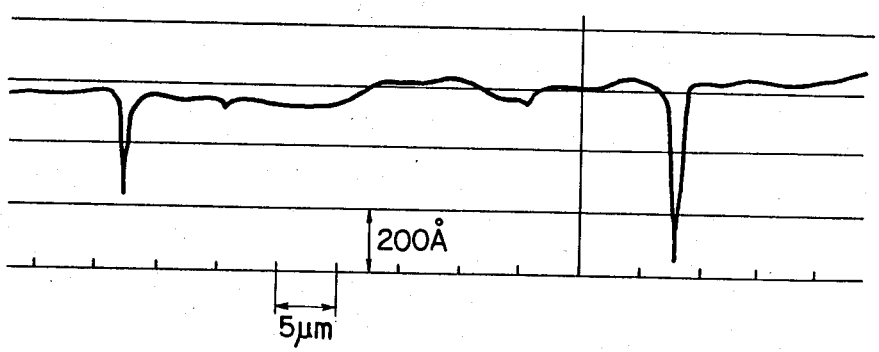

In consequence of various studies made by the present inventors, it has been found that improvements and assurance in and of the properties and reliability of the recording film to be provided on the substrate member can be achieved through the following measure:

As an insulation layer between the surface of an alumina base ceramic material and an upper recording film to be provided, said base material including on the surface micropores of no more than 5 microns (preferably 3 microns) and having a relative theoretical density of no less than 96%, a glass coating film having a relative difference in the coefficient of thermal expansion of $10^{-6}$/deg or less within a range from 20° C. to the strain point of glass with respect to said ceramic material and having a thickness of 0.5 to 220 microns is formed on the surface thereof. The surface of said film is polished under a load of 0.05 to 2 kg/cm$^2$ with a suspension in which 0.1 to 20% by weight of a fine powder comprised of at least one of $SiO_2$, MgO, $Al_2O_3$, $CeO_2$ and $Fe_2O_3$, each of 99% purity or more is suspended in 0.1 to 20% by weight of pure water. The fine powder should be of the grain size no more than 0.1 micron. The polishing is conducted to such an extent that the intermediate thin film becomes ones having a thickness of 0.3–200 microns and a surface roughness of 80 angstroms or less (preferably 50 angstroms or less, most preferably 20 angstroms or less), and having a surface of substantially no pore and no strain.

The alumina base ceramic materials in the present invention embrace $Al_2O_3$ and those containing $Al_2O_3$ as the main (e.g., no less than 50% by weight preferably 65% or more, most preferably 96% or more) component such as $Al_2O_3$—TiC—$TiO_2$, $Al_2O_3$—$TiO_2$, $Al_2O_3$—$Fe_2O_3$—TiC and the like systems. Preferably, these materials are obtained by the forming (or compacting) process such as molding, rubber pressing and doctor blade processes and sintering with the hot pressing (HP) process or the hot isostatic pressing (HIP) process. It is to be understood that the alumina base ceramic materials may contain known grain growth inhibitors such as MgO, NiO, $Cr_2O_3$, etc., and other sintering aids, and the mean crystal grain size of alumina should be preferably no higher than 5 microns. It is also to be noted that there are now commercially available alumina base ceramic materials of one of the general grades expressed in terms of the density of no less than 96%.

Typicals of the preferred alumina base ceramic materials embrace followings:

(1) sintered alumina (preferably purity of 96% or more)
(2) $Al_2O_3$—TiC—$TiO_2$ system (e.g., JP-Patent-Kokai Publication No. 57-135772)
 (i) TiC + $TiO_2$ = 30–50 wt %, and
 $Al_2O_3$ = balance
 (ii) (i) provided that                                  } 100 parts by wt
 [$TiO_2$/(TiC + $TiO_2$)] × 100 = 5–15 wt %
 at least one of MgO, NiO, $Cr_2O_3$ and $ZrO_2$   0.5–5 parts by wt
 $Y_2O_3$                                            0.05–2 parts by wt
(3) $Al_2O_3$—$TiO_2$ system (e.g., JP-Patent-Kokai Publication No. 57-198578)
 (i) $TiO_2$ = 20–60 wt %, and
 $Al_2O_3$ = balance
 (ii) (i)                                              100 parts by wt
 at least one of CaO, MgO and $Y_2O_3$               0.5–5 parts by wt
 $ZrO_2$                                              0.5–10 parts by wt
(4) $Al_2O_3$—$Fe_2O_3$—TiC system (e.g., JP-Patent-Kokai Publication No. 58-1854)
 (i) TiC = 10–30 wt %, and
 $Al_2O_3$—$Fe_2O_3$ solid solution* = balance
 (ii) (i) =                                            100 parts by wt
 at least one of CaO, MgO and $Y_2O_3$ =             0.5–5 parts by wt
 $ZrO_2$ =                                            0.5–10 parts by wt

*N.B. $Al_2O_3$:$Fe_2O_3$ = 1:1 by mol

If the alumina base ceramic substrate according to the present invention includes on the surface micropores of no less than 5 microns, air bubbles remain or are generated in said micropores during the formation of the glass coating film, thus causing a lowering of accuracy in film-forming. Thus, the micropores need to be of a size of no higher than 5 microns, preferably no higher than 3 microns.

The thickness of the glass coating film to be formed on the alumina base ceramic material in the present invention may be selected depending upon the respective purposes. However, where the glazing process is employed for coating, difficulty is involved in maintaining the thickness of coating uniform if the film thickness is below 10 microns. It is also difficult to make the film surface pore-free and strain-free, as sought, and give the required surface roughness thereto by means of the mechanochemical polishing (MCP) process. In a film thickness exceeding 220 microns, a difference in the coefficient of thermal expansion with respect to the base material gives rise to a great amount of stress which, in turn, possibly leads to a large strain within the base material (thus the resultant) substrate member. In film-forming, it is thus required that the film thickness be in a range of 10 to 220 microns. Where the sputtering process is applied for coating, difficulty is involved in maintaining the thickness of coating film uniform if the film thickness is below 0.5 microns. It is also difficult to make the film surface pore-free and strain-free, as desired, and give the required surface roughness thereto by means of the mechanochemical polishing (MCP) process. In a film thickness exceeding 220 microns, a difference in the coefficient of thermal expansion with respect to the base material gives rise to stress which, in turn, possibly leads to a large strain in the resultant substrate member. In film-forming, it is thus required that the film thickness be in a range of 0.5 to 220 microns. In view of the rate of film-forming, the film thickness is preferably in a range of 15 to 25 microns. For similar reasons and with polishing accuracy in mind, the thickness of the coating film after polishing is in a range of 3 to 200 microns where relying upon the glazing process, and is in a range of 0.3 to 200 microns, preferably 10 to 20 microns where relying upon the sputtering process.

In the present invention, at least one of finely divided powders of $SiO_2$, MgO, $CeO_2$, $Fe_2O_3$ and/or $Al_2O_3$ powders are suspended in pure water according to the condition for the MCP process. However, a particle size exceeding 0.1 microns is unpreferred, since the coating film to be polished may then be bruised or scratched on the surface with the resulting deterioration of the surface roughness. Most of such powders are synthetic and may be crystalline, while some of them ($Al_2O_3$, $CeO_2$) may be particulated powder of natural products. The amount of the finely divided powders to be added into pure water should be in a range of 0.1 to 20% by weight. This is because no significant polishing effect is obtained in an amount below 0.1% by weight, while, in an amount exceeding 20% by weight, hydration heat tends to be generated from the respective particles, or gelation tends to take place easily, and an increase in activity results in deterioration of the surface state. The term "pure water" used herein refers to water freed of metal ions, contaminants, especially, organic contaminants, inorganics and suspended matters, and may embrace ion exchanged water, distilled water, etc.

Most suitably, the lap used in the present invention should be of soft metals such as Sn solder alloys or Pb, or hard cloth, etc. Where the lapping load is below 0.05 kg/cm$^2$, the required surface roughness is not obtained with a drop of machining efficiency. On the contrary, a lapping load exceeding 2.0 kg/cm$^2$ might be preferable in view of machining efficiency, but is unpreferred, since there is then a drop of polishing accuracy.

Where the substrate member of the present invention is used as the magnetic disk both sides of which are used for recording, glass coating films are formed on both sides of the alumina base ceramic material, and both films are simultaneously subjected to MCP on the surfaces to counterbalance the internal stresses therein, whereby a substrate member is obtained, which excels in flatness and surface roughness, and is substantially pore-free and strain-free.

As compared with Al alloys, the alumina base ceramic material having thereon the glass coating film according to the present invention has more improved mechanical strength, and is relatively easy to control the dimensional accuracy in the abrasive processing. Furthermore, no special care need be taken of corrosion resistance and weather resistance. The surface contamination is also removed by sputter cleaning, where additional insulating thin films are formed by sputtering.

Where Al alloys are subjected to lathe turning or machining, there is left on their surface an affected layer, which is deteriorated by that machining. With the alumina base ceramic material according to the present invention, on the contrary, no difference in the stress strain between the surface and the bulk body takes place on the surface. Nor is the strain transferred to the recording medium to be coated on the substrate member.

With respect to the crystal state in the coating film on the substrate member of the present invention, it is of the uniform structure in an amorphous state due to the fact that it is formed of glass. Furthermore, the polishing process of the present invention makes it possible to keep any surface processing strain from occurring.

To use such magnetic disk substrate members renders it possible to produce high-density magnetic disk recording media of high reliability. In addition, that a ceramic material of the commercially available standard represented in terms of a relative theoretical density of no less than 96% can be used as the starting alumina base ceramic material offers an advantage in view of mass-production.

EXAMPLES

In what follows, the present invention will be explained with reference to the following non-restrictive examples.

EXAMPLE 1

As the base material use was made of an Al$_2$O$_3$ ceramic material which had been treated with HIP, including on the surface micropores of no higher than 5 microns, having 200 mm and 2 mm diameter and thickness, respectively, and having a purity of 99.95%, a relative theoretical density of 97%, a coefficient of thermal expansion of 77×10$^{-7}$/deg (at 20° C. to the strain point of glass) and a mean crystal grain size of 4 microns. That base material was precisely polished on the surface to a surface roughness of no higher than 200 angstroms (cut-off of 1 mm, the same applies if not otherwise specified) by the precision lapping process. Thereafter, that base material was applied with pasty glass to a film thickness of about 100 microns, said glass having a coefficient of thermal expansion of 74×10$^{-7}$/deg (at 20° C. to the strain point of glass), a softening point of 720° C., a strain point of glass of 510° C. and a powder particle size of 200 mesh-through, and being composed of 72 wt % SiO$_2$, 13 wt % Na$_2$O, 6 wt % K$_2$O, 4 wt % ZnO, 3 wt % Al$_2$O$_3$ and 2 wt % TiO$_2$. Subsequently, the resulting product was maintained at 1000° C. in the air to form a glass coating film. In this case, the rate of temperature rise was 500° C./hr, and the cooling rate was 500° C./hr till the strain point of glass, whereat it was maintained for 1 hour for the removal of strain, followed by gradual cooling. At this time, the surface had a flatness of 5 microns and showed substantially no signs of any pores.

The resultant glass coating film was pre-processed on the surface, using GC abrasive grains having a particle size of 2000 mesh-through and CeO$_2$ abrasive grains having a particle size of 6000 mesh-through in that order. That film was then MCP-finished to a surface roughness of 40 angstroms in a suspension obtained by suspending 5% by weight of finely particulated SiO$_2$ powder of 0.01 micron in particle size in pure water under a lapping load of 0.5 kg/cm$^2$, using as the lap a Sn lap. The allowance was 3 microns, and the flatness was 1 micron.

FIG. 1A illustrates the surface state of the glass coating film of the present invention after MCP, and FIG. 1B shows the surface state of the base material to be coated.

The surface states illustrated in FIG. 1 were determined with a thin film step difference meter with a stylus of 0.1 micron R in diameter (Talystep).

From FIG. 1, it is evident that the micropores on the surface of the ceramic base material are removed by MCP of the glass coating film according to the present invention to achieve a finishing of a surface roughness of 40 angstroms.

To measure the adhesion of the film to the base material, whether or not the glass coating film separated from the base material was measured with varied weights increasing successively from 50 g to 1000 g. As a result, it has been found that such separation did not take place up to a weight of 1000 g, to demonstrate that strong adhesion has been achieved.

The Beilby layer thickness measured by a Ellipsometer was less than 20 angstroms.

EXAMPLE 2

As the base material use was made of an Al$_2$O$_3$ ceramic material which had been treated with HIP, including on the surface micropores of no higher than 3 microns, having 100 mm and 2 mm diameter and thickness, respectively, and having a purity of 99.95%, a relative theoretical density of 99%, a coefficient of thermal expansion of 77×10$^{-7}$/deg (at 20° C. to the strain point of glass) and a mean crystal grain size of 4 microns. That base material was precisely polished to a surface roughness of 200 angstroms. With a high-frequency sputtering device, a film of about 0.1 micron in thickness was formed on the base material, using as the target plate $SiO_2$ of 350 mm and 6 mm in diameter and thickness and 99.9% purity. Thereafter, glass having a coefficient of thermal expansion of $77 \times 10^{-7}$/deg (at 20° C. to the strain point of glass), a softening point of 470° C. and the strain point of 380° C. and being composed of 60 wt % PbO, 19 wt % ZnO, 12 wt % $B_2O_3$ and 9 wt % $SiO_2$ was pulverized to 200 mesh-through, was formulated into a pasty form, and was applied on the base material to a film thickness of 30 mciron. The resulting product was maintained at 800° C. for 10 minutes in the air to form a glass coating film. In this case, the rate of temperature rise was 500° C./hr till 400° C. at which the temperature was maintained for 1 hour, and the subsequent rate of temperature rise was again 500° C./hr till 800° C. which was maintained for 10 minutes. Cooling was carried out at a cooling rate of 500° C./hr until the strain point, at which the temperature was maintained for 1 hour, followed by gradual cooling. The thus formed glass coating film was MCP-finished to a surface roughness of 40 angstorms in a suspension obtained by suspending 2% by weight of finely particulated $CeO_2$ powder of 0.05 microns in particle size in pure water under a lapping load of 1 kg/cm², using a hard cloth lap as the lap. The allowance was 20 microns.

FIG. 2A illustrates the surface state of the resultant glass coating film of the present invention after MCP, and FIG. 2B shows the surface state of the base material to be coated. The surface states were measured with the same thin film step difference meter as used in Example 1.

Figure 2:
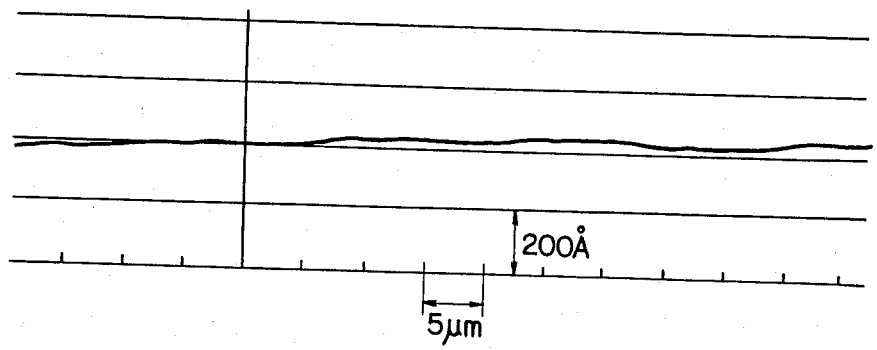
Figure 2:
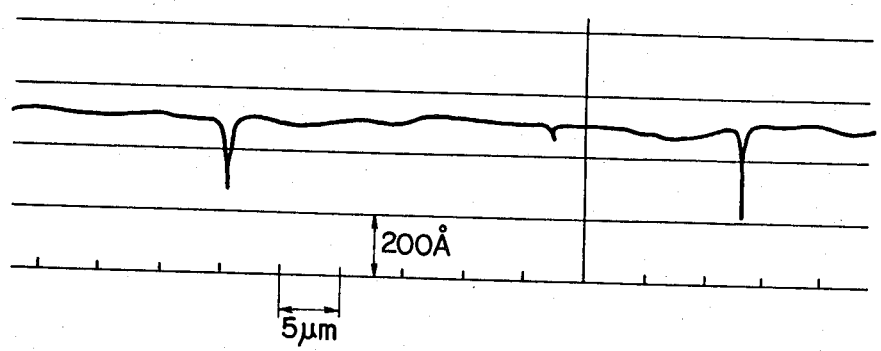

From FIG. 2, it is clearly noted that the micropores on the surface of the ceramic base material had been removed by MCP of the glass coating film according to the present invention to achieve a finishing of a surface roughness of 40 angstroms.

The Beilby layer thickness was less than 20 angstroms.

EXAMPLE 3

As the base material use was made of an $Al_2O_3$—TiC base ceramic material (the mean crystal grain sizes of alumina and TiC being 4 microns and 2 microns, respectively), which had been HIP-treated, including on the surface micropores of no higher than 5 microns, having 200 mm and 2 mm diameter and thickness, respectively, having a relative theoretical density of 97% and a coefficient of thermal expansion of $78 \times 10^{-7}$/deg (20° to 510° C.), and containing 65% by weight of $Al_2O_3$. That base material was precisely polished to a surface roughness of 200 angstroms by the precision lapping process. Thereafter, with a high-frequency sputtering device, sputtering was carried out, using as the target plate glass having a coefficient of thermal expansion of $74 \times 10^{-7}$/deg (at 20° to 510° C.), a diameter of 350 mm and a thickness of 6 mm, and being composed of 72 wt % $SiO_2$, 12 wt % $Na_2O$, 6 wt % $K_2O$, 4 wt % ZnO, 3 wt % $Al_2O_3$ and 3 wt % $TiO_2$, after a sputtering Ar pressure of $1 \times 10^{-5}$ mbar had been reached through evacuation. For the cleaning of the base material surface, the surface layer was removed by a thickness of about 500 angstroms by reverse sputtering prior to normal sputtering.

The power applied for the normal sputtering was 3 kW. A negative bias ($-100$ V) was applied upon the side of the base material to be not coated. The resulting bias effect gave rise to a step coverage for the ceramic pore portions, so that the glass was also deposited on such portions. In this connection, it is noted that the sputtered film had a surface roughness of 500 angstroms. According to the conventional sputtering process for oxides, the rate of sputtering was so slow that film-depositing required a prolonged period of time. However, with the arrangement of a distance between electrodes of as small as 40 mm and by the application of an increased power, the rate of sputtering became 500 angstroms/min, and the time required for forming a film of 20 microns was 400 minutes.

The thus formed sputtered film was MCP-finished to a surface roughness of 40 angstoms in a suspension obtained by suspending 5% by weight of finely divided $SiO_2$ powder of 0.01 micron in particle size in pure water under a lapping load of 0.5 kg/cm², using a Sn lap as the lap. The allowance was 3 microns.

Figure 3:
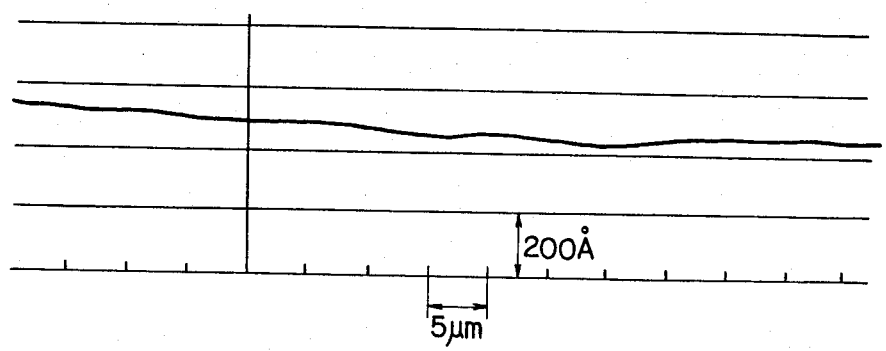
Figure 3:
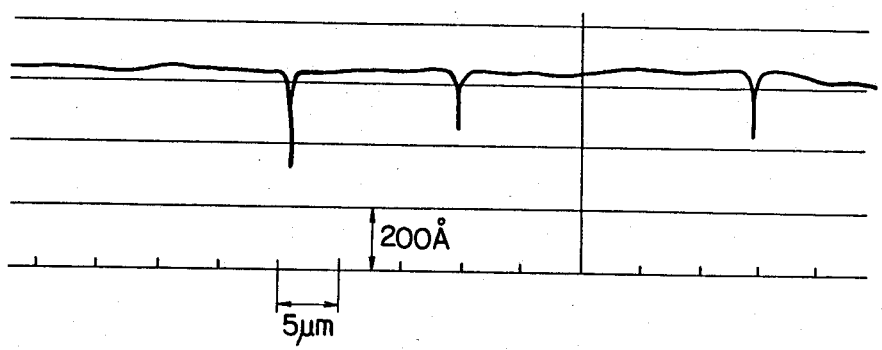

The surface states of the resultant sputtered glass film according to the present invention after MCP and of the base material prior to sputtering are shown in FIGS. 3A and 3B, respectively. The surface states illustrated were measured with the same thin film step difference meter as used in Example 1.

The Beilby layer thickness was less than 20 angstroms.

As mentioned in the foregoing, the present invention prevents a lowering of product yields attributable to substrate (substrate member) deficiencies, and assures and improves the properties and reliability of the magnetic films formed onto the surface of the pore-free substrate members.

It should be understood that the present invention may be modified without departing from the gist and scope of the present invention which has been described in the entire disclosure and defined in the accompanying claims.

What is claimed is:

1. A substrate member for recording disk characterized in that a glass coating film is provided on an alumina base ceramic material having micropores of no larger than 5 microns and a relative theoretical density of no less than 96%, said glass coating film having a surface roughness of no more than 80 angstroms, being substantially pore-free and strain-free on the surface, and having a thickness of 0.3 to 200 microns and a relative difference of no more than $10^{-6}$/deg in the coefficient of thermal expansion with respect to said alumina base ceramic material.

2. The substrate member as defined in claim 1, wherein the surface roughness is no more than 50 angstroms.

3. The substrate member as defined in claim 2, wherein the surface roughness is no more than 20 angstroms.

4. The substrate member as defined in claim 1, wherein the Bailby layer thickness is no more than 50 angstroms.

5. The substrate member as defined in claim 4, wherein the Bailby layer thickness is no more than 20 angstroms.

6. The substrate member as defined in claim 1, wherein the surface includes no pores having a diameter exceeding 0.2 micron.

7. The substrate member as defined in claim 1, wherein the surface includes no pores having a diameter exceeding 0.1 micron.

8. The substrate member as defined in claim 1, wherein said alumina base ceramic material is a sintered product of $Al_2O_3$, $Al_2O_3$—TiC—$TiO_2$, $Al_2O_3$—$TiO_2$ or $Al_2O_3$—$Fe_2O_3$—TiC.

* * * * *